(12) United States Patent
Ziemer et al.

(10) Patent No.: US 10,174,816 B2
(45) Date of Patent: Jan. 8, 2019

(54) TRANSMISSION FOR A VEHICLE

(71) Applicant: ZF Friedrichshafen AG, Friedrichshafen (DE)

(72) Inventors: Peter Ziemer, Tettnang (DE); Stefan Beck, Eriskirch (DE); Martin Brehmer, Tettnang (DE); Matthias Horn, Tettnang (DE); Johannes Kaltenbach, Friedrichshafen (DE); Julian King, Rankwell (AT); Jens Moraw, Friedrichshafen (DE); Eckehard Münch, Bünde (DE); Juri Pawlakowitsch, Horgenzell (DE); Stephan Scharr, Friedrichshafen (DE); Viktor Warth, Friedrichshafen (DE); Michael Wechs, Weißensberg (DE); Uwe Griesmeier, Markdorf (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 48 days.

(21) Appl. No.: 15/149,718

(22) Filed: May 9, 2016

(65) Prior Publication Data
US 2016/0333985 A1 Nov. 17, 2016

(30) Foreign Application Priority Data

May 11, 2015 (DE) .......................... 10 2015 208 673

(51) Int. Cl.
*F16H 3/66* (2006.01)
*F16H 3/72* (2006.01)
(Continued)

(52) U.S. Cl.
CPC ............. *F16H 3/725* (2013.01); *B60K 6/365* (2013.01); *B60K 6/442* (2013.01); *B60K 6/547* (2013.01); *F16H 3/663* (2013.01); *B60Y 2200/92* (2013.01); *B60Y 2300/182* (2013.01); *B60Y 2400/73* (2013.01); *F16H 2003/442* (2013.01); *F16H 2200/0052* (2013.01); *F16H 2200/2007* (2013.01); *F16H 2200/2012* (2013.01); *F16H 2200/2023* (2013.01); *F16H 2200/2043* (2013.01); *F16H 2200/2097* (2013.01); *Y10S 903/91* (2013.01); *Y10S 903/951* (2013.01)

(58) Field of Classification Search
CPC . F16H 3/725; F16H 3/72; F16H 3/724; F16H 3/663; F16H 2200/2023; F16H 2200/2097; F16H 3/66; B60K 6/365
See application file for complete search history.

(56) References Cited

U.S. PATENT DOCUMENTS

| | | | | |
|---|---|---|---|---|
| 7,261,665 B2 * | 8/2007 | Friedmann | ............. | B60K 6/365 475/275 |
| 8,882,633 B2 * | 11/2014 | Misala | ................... | H02K 7/116 477/5 |

FOREIGN PATENT DOCUMENTS

DE 102013223426 A1 12/2014
DE 102013223427 A1 12/2014

* cited by examiner

*Primary Examiner* — Erin D Bishop
(74) *Attorney, Agent, or Firm* — Dority & Manning, P.A.

(57) ABSTRACT

A transmission for a motor vehicle includes a drive shaft, an upstream gear set and a main gear set. A shaft of the upstream gear set is configured to make available reduced rotational speed and is a component of a first power path at a first shaft of the main gear set. The drive shaft is a component of a second power path at a second shaft of the main gear set.

15 Claims, 7 Drawing Sheets

(51) Int. Cl.
  *B60K 6/547* (2007.10)
  *B60K 6/365* (2007.10)
  *B60K 6/442* (2007.10)
  *F16H 3/44* (2006.01)

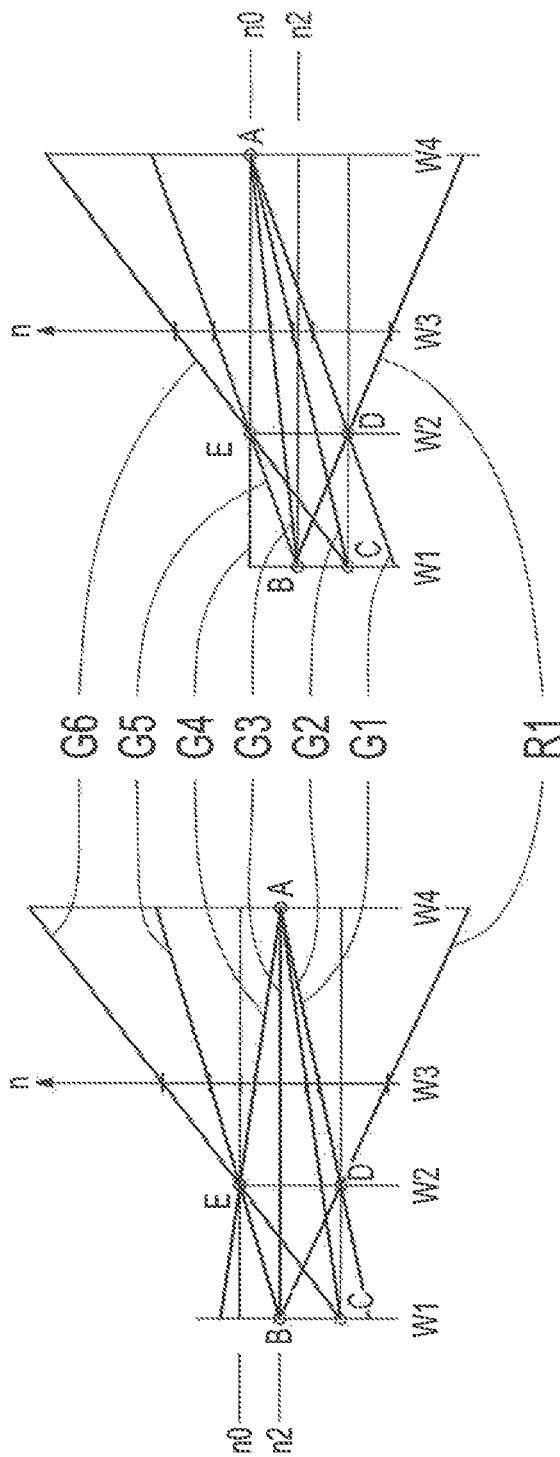

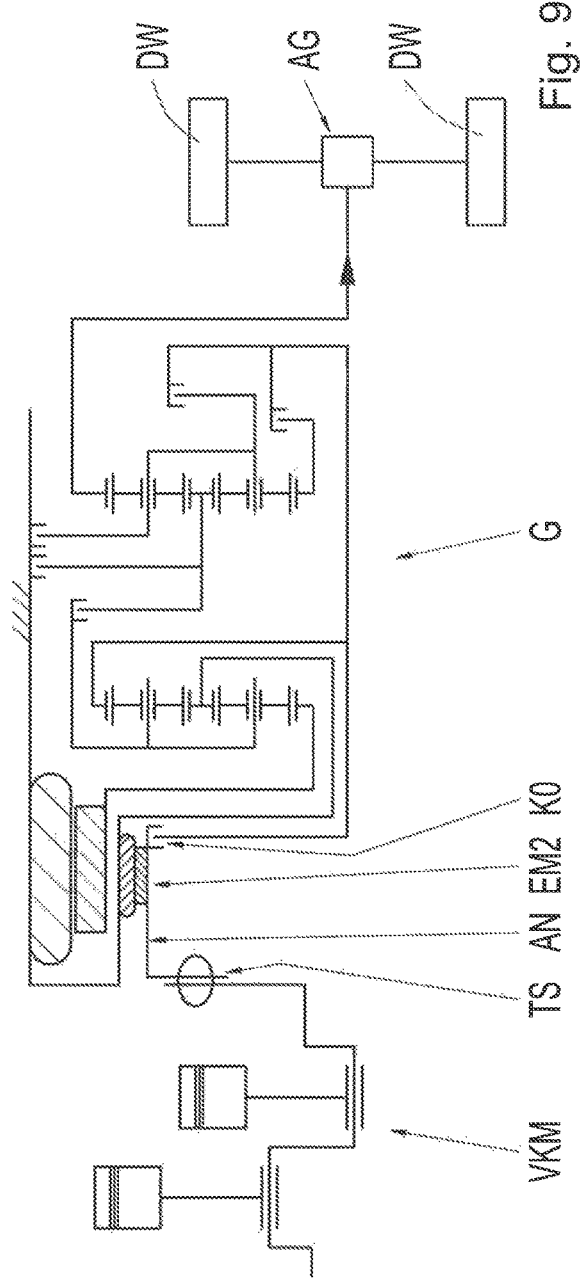

TRANSMISSION FOR A VEHICLE

FIELD OF THE INVENTION

The present invention relates generally to a transmission for a motor vehicle, with a drive shaft, an output shaft, an upstream gear set, a main gear set, an electric motor with a rotatable rotor and a torque-proof stator, and at least three shift elements. The present invention also relates generally to a hybrid drive train for a motor vehicle.

BACKGROUND

Herein, a transmission in particular designates a multi-speed transmission, with which a multitude of gears, thus transmission ratio relationships between the drive shaft and the output shaft, are shiftable by shift elements, preferably automatically. Herein, the shift elements comprise, for example, clutches or brakes. Such transmissions are primarily used in automotive applications, in order to adjust the rotational speed and torque output characteristics of the drive unit to the driving resistance of the vehicle in a suitable manner.

Patent application DE 10 2013 223 427 A1 of the applicant describes a power-shifting transmission for a hybrid drive train, comprising an upstream gear set and a main gear set, each of which consists of two dual planetary gear sets that are coupled with each other. The upstream gear set is configured to make available two rotational speeds that are reduced compared to the rotational speed of the transmission input shaft. Thereby, the rotor of the electric motor is constantly connected to the shaft of the main gear set that is first in the order of rotational speeds.

Patent application DE 10 2013 223 426 A1 of the applicant describes a transmission for a hybrid drive train, comprising an upstream gear set and a main gear set, each of which consists of two dual planetary gear sets that are coupled with each other. The upstream gear set is configured to make available a rotational speed that is increased compared to the rotational speed of the transmission input shaft and a rotational speed that is reduced compared to the rotational speed of the transmission input shaft. Thereby, the rotor of the electric motor is constantly connected to the shaft of the main gear set that is first in the order of rotational speeds.

In both known transmissions, the rotor of the electric motor is attached to the shaft of the main gear set that is first in the order of rotational speeds. In the rotational speed diagrams shown in FIG. 1 of the aforementioned patent applications, it is clearly recognizable that the rotational speed of the first shaft of the main gear set regularly takes on only low rotational speeds, or is even fixed in a torque-proof manner. If this first shaft is fixed in a torque-proof manner, it is not able to deliver or absorb any torque. With a low rotational speed of such first shaft, the electric motor must have such correspondingly large dimensions to be able to deliver the torque necessary for the target power. This is undesirable, because, in driving mode, the electric motor should be available wherever possible in any gear to deliver and absorb power; for example, for recuperation. Thereby, the electric motor should feature dimensions that are as small as possible.

SUMMARY OF THE INVENTION

The task of the present invention to provide a transmission for a motor vehicle, which features an electric motor with a compact design, which is available in each gear of the transmission to absorb and deliver power.

The transmission features an upstream gear set, a main gear set, an electric motor with a rotatable rotor and a torque-proof stator, and at least three shift elements.

The main gear set features a first planetary gear set and a second planetary gear set with a total of four shafts, designated in the order of rotational speeds as the first, second, third and fourth shafts. As such, the main gear set is designed as a so-called two connections/four shafts—transmission. A two connections/four shafts—transmission is understood to mean a planetary transmission that is formed from two individual planetary gear sets that are kinematically coupled with each other by exactly two coupling shafts and with which four of its elements ("shafts") are freely accessible for other transmission elements. Thereby, a coupling shaft is defined as a constant mechanical connection between one element—thus, a sun gear or a carrier or a ring gear—of the first individual planetary gear set with one element—thus, a sun gear or a carrier or a ring gear—of the second individual planetary gear set. The number of individual planetary gear sets and the number of free shafts are not defined by the visual appearance of the transmission, but through its kinematics. For the graphic presentation of the kinematics of the transmission, a rotational speed diagram of the transmission (for example, the Kutzbach diagram known from transmission theory) is typically used.

The upstream gear set is configured to make available, on one of its shafts, an increased rotational speed for the rotational speed of the drive shaft and, on another of its shafts, a reduced rotational speed for the rotational speed of the drive shaft. The provision of the different rotational speeds takes place purely mechanically, by which the transmission ratio relationships between the shafts of the upstream gear set are fixed. This is achieved, for example, by the fact that the upstream gear set is formed as a two connections/four shafts—transmission, whereas a shaft of the upstream gear set arranged as the first in the order of rotational speeds is constantly fixed in a torque-proof manner. The shaft of the upstream gear set arranged as the third in the order of rotational speeds is constantly connected to the drive shaft. The shaft of the upstream gear set arranged as the second in the order of rotational speeds makes available the rotational speed that is reduced compared to the drive shaft. The shaft of the upstream gear set arranged as the fourth in the order of rotational speeds makes available the rotational speed that is increased compared to the drive shaft. This formation of the planetary gear set is to be viewed as merely exemplary. Alternatively, the upstream gear set could be formed by two spur gear stages, which make available the increased or reduced rotational speed, as the case may be, on two lay shafts.

That shaft of the upstream gear set that is configured to make available the rotational speed that is reduced compared to the rotational speed of the drive shaft forms a component of a switchable first power path at a first shaft of the four shafts of the main gear set. The drive shaft itself is a component of a switchable second power path at a second shaft of the four shafts of the main gear set. In other words, one shift element of the at least three shift elements is arranged between a first shaft of the four shafts of the main gear set and that shaft of the upstream gear set that makes available the reduced rotational speed. One additional shift element of the at least three shift elements is arranged directly between the drive shaft and a second shaft of the four shafts of the main gear set. The first and second power paths can be switched. If the shift element allocated to the power path is opened, this power path is not able to transfer any power.

Through the selective closing of the shift elements in pairs, the rotational speed relationships of the four shafts of the main gear set can be determined. In doing so, a plural number of switchable forward gears between the drive shaft and the output shaft can be produced. In other words, exactly two shift elements are closed in every forward gear. By closing two shift elements, the rotational speed relationships of the four shafts of the gear set to each other are determined.

In accordance with exemplary aspects of the invention, the rotor of the electric motor is constantly connected to that shaft of the upstream gear set that is configured to make available the rotational speed that is increased compared to the rotational speed of the drive shaft. This gives rise to a transmission ratio that is fixed and independent of the gears between the drive shaft and the rotor of the electric motor, whereas the rotor always features a higher rotational speed than the drive shaft. Thus, the rotor can be operated for producing or absorbing a target power with a higher rotational speed. This enables a smaller design of the electric motor. Since the rotor is constantly connected to a shaft of the upstream gear set that has a fixed transmission ratio relationship at the drive shaft, the rotor always has a rotational speed if the drive shaft also has a rotational speed. This ensures that, in driving mode, the rotor has a rotational speed in each gear, and is thus available for the delivery and absorption of power.

Preferably, the transmission features a total of five shift elements for producing the forward gears. The first shaft of the main gear set can be fixed in a torque-proof manner by the third shift element of the five shift elements, by the first shaft being connected through the third shift element to a housing or another torque-proof component of the transmission. In addition, the first shaft of the main gear set is connectable through the second shift element of the five shift elements to that shaft of the upstream gear set to which the rotational speed that is reduced compared to the rotational speed of the drive shaft is made available. The second shaft of the main gear set can be fixed in a torque-proof manner by the fourth shift element of the five shift elements, by the second shaft being connected through the fourth shift element to the housing or another torque-proof component of the transmission. In addition, the second shaft of the main gear set is connectable through the fifth shift element of the five shift elements to the drive shaft. The third shaft of the main gear set is constantly connected to the output shaft of the transmission. The fourth shaft of the main gear set is connectable through the first shift element of the five shift elements to either the drive shaft or to that shaft of the upstream gear set to which the rotational speed that is reduced compared to the rotational speed of the drive shaft is made available. This allocation of the shift elements between the shafts of the main gear set, the shafts of the upstream gear set, the drive shaft and the housing enables the formation of at least six forward gears without any group gearshifts, and is thus particularly suitable for use in motor vehicles.

By selectively actuating the five shift elements, at least six forward gears between the drive shaft and the output shaft are automatically shiftable. The first forward gear is formed by closing the first shift element and the fourth shift element. The second forward gear is formed by closing the first shift element and the third shift element. The third forward gear is formed by closing the first shift element and the second shift element. The fourth forward gear is formed by closing the first shift element and the fifth shift element. The fifth forward gear is formed by closing the second shift element and the fifth shift element. The sixth forward gear is formed by closing the third shift element and the fifth shift element. Through this allocation of the first to fifth shift elements at the individual forward gears, upon a suitable selection of the stationary transmission ratio of the planetary gear sets of the main gear set and the transmission ratio relationships of the upstream gear set, a transmission ratio sequence that is well-suited for use in a motor vehicle is achieved. In addition, two adjacent gears always feature one shift element, which is closed in both of such gears. Therefore, upon a shifting process to an adjacent gear, only one shift element must be opened and only one shift element must be closed. This simplifies the shifting process and shortens the duration of shifting. In addition, this shifting diagram enables shift elements that are not simultaneously actuated, such as the fourth and the fifth shift elements, to be actuated by a double-acting actuator.

In accordance with one exemplary embodiment, by closing the second shift element and the fourth shift element, a reverse gear between the drive shaft and the output shaft arises. The reverse gear is only provided as an option, since, by the operation of the electric motor, a reverse gear could be formed against a preferential direction and the engagement of a forward gear. However, if the operation of the electric motor is not available, such a reverse gear that can be mechanically formed is advantageous for the functionality of the motor vehicle.

Preferably, the first shift element is formed as a positive-locking shift element. In a closed state, positive-locking shift elements establish the connection through a positive connection, and in an open state are characterized by drag losses that are lower than force-fitting shift elements. For example, the first shift element may be designed as a claw shift element, which may also be formed without a synchronizing device. Due to the low drag losses in an open state, the degree of efficiency of the transmission is further improved, in particular since the first shift element is closed only in the first through fourth forward gears of the motor vehicle. Therefore, in the operation of the transmission, the first shift element is predominantly open in high gears (for example, during highway driving).

Alternatively or additionally, the fourth shift element may also be formed as a positive-locking shift element, in particular as a claw shift element. Moreover, during the operation of the transmission, the fourth shift element is opened for a predominant amount of time, as it is only closed in the first forward gear and in the optionally provided reverse gear. Therefore, the formation of the fourth shift element as a positive-locking shift element improves the degree of efficiency of the transmission, without negatively affecting the shifting dynamics. Upon a shifting process between the reverse gear and the first forward gear, the fourth shift element remains closed.

Thus, this sensitive shifting process is not affected by the formation of the fourth shift element as a positive-locking shift element.

In accordance with one exemplary embodiment, the upstream gear set features a third planetary gear set and a fourth planetary gear set, which form a Ravigneaux gear set with a combined ring gear. A Ravigneaux gear set forms a two connections/four shafts—transmission, and consists of two planetary gear sets, whereas one of the planetary gear sets is formed as a negative gear set and the other planetary gear set is formed as a positive gear set. The carrier of negative gear set is constantly connected to the carrier of the positive gear set, by which a common carrier is formed. In the design with a combined ring gear, the outer planetary gears of the planetary gear set formed as a positive gear set and the planetary gears of the planetary gear set formed as a negative gear set mesh with the same ring gear. A Ravigneaux gear set is characterized by a high degree of efficiency, a low need for installation space and simple manufacturing feasibility, and is thus particularly suitable for the present application. Thereby, a sun gear of the fourth planetary gear set designed as a positive gear set is fixed in a torque-proof manner, by the sun gear being constantly connected to the housing or to another torque-proof component of the transmission. The common carrier of the third and fourth planetary gear sets is constantly connected to the drive shaft. A sun gear of the third planetary gear set formed as a negative gear set is constantly connected to the rotor of the electric motor. The combined ring gear of the third and fourth planetary gear sets is a component of that shaft of the upstream gear set that makes available the reduced rotational speed. This formation of the upstream gear set is characterized by good accessibility to the shafts of the upstream gear set.

In accordance with an additional exemplary embodiment, the upstream gear set is formed as a Ravigneaux gear set with a combined sun gear. Thereby, the inner planetary gears of the fourth planetary gear set formed as a positive gear set and the planetary gears of the third planetary gear set formed as a negative gear set mesh with the same sun gear. The combined sun gear of the third and fourth planetary gear sets is constantly fixed in a torque-proof manner by being constantly connected in a torque-proof manner to the housing or to another torque-proof component of the transmission. A ring gear of the fourth planetary gear set formed as a positive gear set is a component of that shaft of the upstream gear set that is configured to make available the reduced rotational speed. The common carrier of the third and fourth planetary gear sets is constantly connected to the drive shaft. A ring gear of the third planetary gear set formed as a negative gear set is constantly connected to the rotor of the electric motor. Moreover, this formation of the upstream gear set is characterized by good accessibility to the shafts of the upstream gear set.

In accordance with an additional exemplary embodiment, the third and fourth planetary gear sets of the upstream gear set are formed by negative gear sets, which are coupled to each other at the carrier and the ring gear, by which a two connections/four shafts—transmission is also formed. Thereby, the combined ring gear of the third and fourth planetary gear sets is constantly fixed in a torque-proof manner, by being connected to the housing or another torque-proof component of the transmission. The carrier of the third planetary gear set and the carrier of the fourth planetary gear set are components of that shaft of the upstream gear set that is configured to make available the reduced rotational speed. A sun gear of the fourth planetary gear set is constantly connected to the drive shaft. A sun gear of the third planetary gear set is constantly connected to the rotor of the electric motor. Moreover, this formation of the upstream gear set is characterized by good accessibility to the shafts of the upstream gear set. In particular, the torque-proof fixing of the combined ring gear leads to a simple manufacturing feasibility of the transmission.

In accordance with an additional exemplary embodiment, the third and fourth planetary gear sets are formed by negative gear sets, whereas the fourth planetary gear set is arranged radially within the third planetary gear set, and a sun gear of the third planetary gear set is formed on the outside diameter of a ring gear of the fourth planetary gear set. The carrier of the third planetary gear set is connected to the carrier of the fourth planetary gear set. The ring gear of the third planetary gear set is constantly connected to the drive shaft. The carrier of the third planetary gear set is a component of that shaft of the upstream gear set that is configured to make available the reduced rotational speed. The sun gear of the fourth planetary gear set is constantly connected to the rotor of the electric motor. The ring gear of the fourth planetary gear set is constantly fixed in a torque-proof manner, by being constantly connected to the housing or another torque-proof component of the transmission. Moreover, this formation of the upstream gear set is characterized by good accessibility to the shafts of the upstream gear set. Through the arrangement of the fourth planetary gear set radially within the third planetary gear set, the need for axial installation space of this embodiment is particularly low.

In accordance with one exemplary embodiment, the main gear set is formed as a Ravigneaux gear set with a combined ring gear. A sun gear of the first planetary gear set formed as a negative gear set forms a component of the first shaft of the main gear set. The carriers of the first and second planetary gear sets are components of the second shaft of the main gear set. The combined ring gear of the first and second planetary gear sets forms a component of the third shaft of the main gear set. A sun gear of the second planetary gear set formed as a positive gear set forms a component of the fourth shaft of the main gear set. This design of the main gear set is characterized by a high degree of efficiency, simple manufacturing feasibility and good accessibility to the four shafts of the main gear set.

In accordance with an additional exemplary embodiment, the first and second planetary gear sets of the main gear set are formed as negative gear sets with a dual carrier/ring gear coupling. The sun gear of the first planetary gear set is a component of the first shaft of the main gear set. The carrier of the first planetary gear set and the ring gear of the second planetary gear set are components of the second shaft of the main gear set. The ring gear of the first planetary gear set and the carrier of the second planetary gear set are components of the third shaft of the main gear set. The sun gear of the second planetary gear set is a component of the fourth shaft of the main gear set. Moreover, this design of the main gear set is characterized by a high degree of efficiency, simple manufacturing feasibility and good accessibility to the four shafts of the main gear set.

In accordance with an additional exemplary embodiment, the first and second planetary gear sets of the main gear set are formed as negative gear sets, whereas the second planetary gear set is arranged radially within the first planetary gear set, and the sun gear of the first planetary gear set is formed on the outer diameter of the ring gear of the second planetary gear set. The sun gear of the first planetary gear set is a component of the first shaft of the main gear set. The carrier of the first planetary gear set and the carrier of the second planetary gear set are connected to each other, and are components of the second shaft of the main gear set. The ring gear of the first planetary gear set is a component of the third shaft of the main gear set. The sun gear of the second planetary gear set is a component of the fourth shaft of the main gear set. This embodiment of the main gear set is characterized by a particularly low need for axial installation space.

Preferably, the transmission features a connecting shaft, which is connectable through a sixth shift element to the drive shaft of the transmission. By opening the sixth shift element, an all-electric drive of the motor vehicle by the electric motor of the transmission is possible, without having to carry along a drive unit connected to the connecting shaft. The sixth shift element may be formed as a force-fitting or as a positive-locking shift element.

The transmission may comprise a second electric motor, the rotor of which is constantly connected to the connecting shaft. Thereby, the functionality of the transmission can be further increased, for example in order to enable a start of a drive assembly connected to the connecting shaft while the sixth shift element is open.

The transmission may be a component of a hybrid drive train of a motor vehicle. The hybrid drive train features, in addition to the transmission, an internal combustion engine, which is connected through a torsional vibration damper to the connecting shaft of the transmission. The output shaft of the transmission is connected to an output, which is connected to the wheels of the motor vehicle. The hybrid drive train enables multiple drive modes of the motor vehicle. During electric driving mode, the motor vehicle is powered by the electric motor of the transmission, whereas the sixth element is open. During internal combustion engine mode, the motor vehicle is powered by the internal combustion engine, whereas the sixth element is closed. During hybrid mode, the motor vehicle is powered by both the internal combustion engine and the electric motor of the transmission.

An electric motor consists at least of one torque-proof stator and one rotatably mounted rotor, and, during engine mode, is configured to convert electrical energy into mechanical energy in the form of rotational speed and torque, and, during generator mode, to convert mechanical energy into electrical energy in the form of current and voltage.

A planetary gear set comprises a sun gear, a carrier and a ring gear. Planetary gears, which mesh with the toothing of the sun gear and/or with the toothing of the ring gear, are rotatably mounted on the carrier. A negative gear set designates a planetary gear set with a carrier, on which the planetary gears are rotatably mounted, with a sun gear and a ring gear, whereas the toothing of at least one of one of the planetary gears meshes both with the toothing of the sun gear and with the toothing of the ring gear, by which the ring gear and the sun gear rotate in opposite directions of rotation, if the sun gear rotates with a fixed carrier. A positive gear set differs from the negative planetary gear set just described in that the positive gear set features inner and outer planetary gears, which are rotatably mounted on the carrier. Thereby, the toothing of the inner planetary gears meshes, on the one hand, with the toothing of the sun gear and, on the other hand, with the toothing of the outer planetary gears. In addition, the toothing of the outer planetary gears meshes with the toothing of the ring gear. This has the consequence that, with a fixed carrier, the ring gear and the sun gear rotate in the same direction of rotation.

Through shift elements, depending on their operating state, a relative movement between two components is enabled, or a connection for the transmission of a torque between the two components is established. A "relative movement" is understood as, for example, a rotation of two components, whereas the rotational speed of the first component and the rotational speed of the second component differ from each other. In addition, the rotation of only one of the two components is conceivable, while the other component is at a standstill or rotates in the opposite direction.

A constant connection is designated as a connection between two elements, which always exists. Such constantly connected elements always rotate with the same interdependence between their rotational speeds. No shift element can be located in a constant connection between two elements. Thus, a constant connection must be distinguished from a shiftable connection.

BRIEF DESCRIPTION OF THE DRAWINGS

Exemplary embodiments of the invention are described in detail on the basis of the attached figures.

FIG. 6 shows a rotational speed diagram of the first and fifth exemplary embodiments of the transmission.

FIG. 7 shows a rotational speed diagram of the second through fourth exemplary embodiments of the transmission.

FIG. 8 shows a shifting diagram of the exemplary transmission.

FIG. 9 shows a hybrid drive train of a motor vehicle.

DETAILED DESCRIPTION

Figure 1:
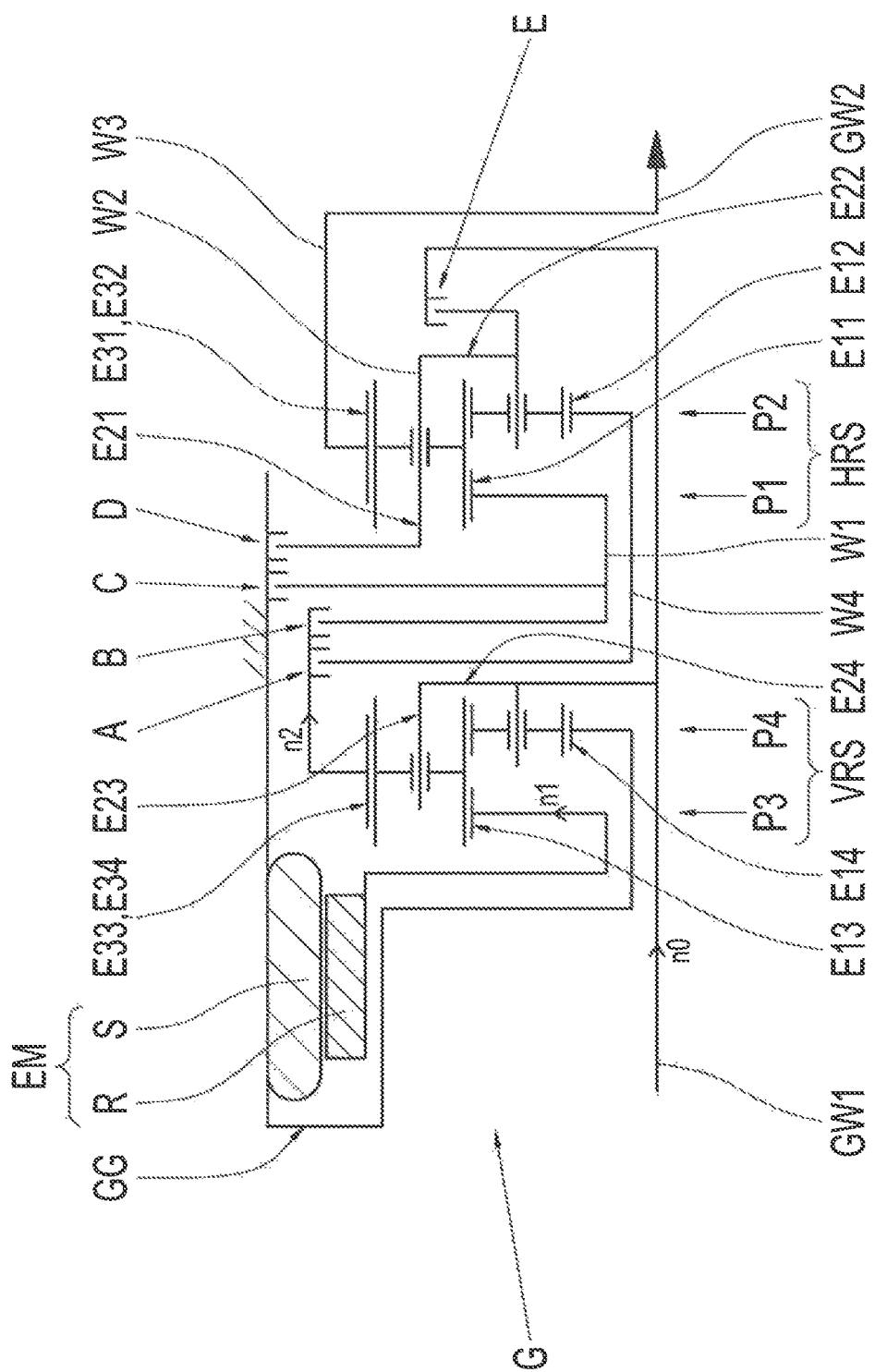
FIG. 1 schematically shows a transmission according to a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a transmission G for a motor vehicle according to a first exemplary embodiment of the invention. The transmission G features a drive shaft GW1, an output shaft GW2, an electric motor EM with a torque-proof stator S and a rotatable rotor R, a main gear set HRS with a first planetary gear set P1 and a second planetary gear set P2, along with an upstream gear set VRS with a third planetary gear set P3 and a fourth planetary gear set P4.

The upstream gear set VRS is formed as a Ravigneaux gear set with a combined ring gear E33, E34. The rotor R is constantly connected to a sun gear E13 of the third planetary gear set P3 formed as a negative planetary gear set. The drive shaft GW1 is constantly connected to the common carrier E23, E24 of the third and fourth planetary gear sets P3, P3. The sun gear E14 of the fourth planetary gear set P4 formed as a positive gear set is constantly fixed in a torque-proof manner, by being constantly connected to a housing GG or to another torque-proof component of the transmission G. This connection gives rise to fixed rotational speed relationships between the drive shaft GW1, the rotor R and the combined ring gear E33, E34, which depend on the stationary transmission ratios of the third and fourth planetary gear sets P3, P4. Thereby, the rotational speed n1 of the rotor is always higher than the rotational speed n0 of the drive shaft GW1. Thereby, the rotational speed n2 of the combined ring gear E33, E34 is always below the rotational speed n0 of the drive shaft GW1.

The main gear set HRS is likewise formed as a Ravigneaux gear set with a combined ring gear E31, E32. The main gear set HRS features a total of four shafts, which according to their sequence in the order of rotational speeds, are designated as the first, second, third and fourth shafts W1, W2, W3, W4. A sun gear E11 of the first planetary gear set P1 formed as a negative gear set is a component of the first shaft W1 of the main gear set HRS. A carrier E21 and a carrier E22 of the first and second planetary gear sets P1, P2 are components of the second shaft W2 of the main gear set HRS. The combined ring gear E31, E32 is a component of the third shaft W3 of the main gear set HRS. A sun gear E12 of the second planetary gear set P2 formed as a positive gear set is a component of the fourth shaft W4 of the main gear set HRS. The third shaft W3 of the main gear set HRS is constantly connected to the output shaft GW2.

The transmission G features a total of five shift elements; i.e., a first shift element A, a second shift element B, a third shift element C, a fourth shift element D and a fifth shift element E. By closing the first shift element A, that shaft of the upstream gear set VRS at which the rotational speed n2 that is reduced compared to the rotational speed of the drive shaft GW1 is provided; it is connectable to the fourth shaft of the main gear set W4. Thus, the first shift element A is in the operative connection between the combined ring gear E33, E34 of the upstream gear set VRS and the sun gear E12 of the second planetary gear set P2 of the main gear set HRS. By closing the second shift element B, that shaft of the upstream gear set at which the reduced rotational speed n2 applies is connectable to the first shaft W1 of the main gear set HRS. By closing the third shift element C, the first shaft W1 of the main gear set HRS can be fixed in a torque-proof manner. By closing the fourth shift element D, the second shaft W2 of the main gear set HRS can be fixed in a torque-proof manner. By closing the fifth shift element E, the drive shaft GW1 is connectable to the second shaft W2 of the main gear set HRS.

The first to fourth shift element A-D are arranged axially between the upstream gear set VRS and the main gear set HRS, in the axial sequence of first shift element A, second shift element B, third shift element C, fourth shift element D, starting from the upstream gear set VRS. Thereby, no shaft of the transmission G leads radially outside of the first to fourth shift elements A-D, by which such shift elements A-D are easily accessible radially from the outside for actuating devices.

The five shift elements A, B, C, D, E are shown schematically in the form of force-fitting shift elements. However, this is not to be viewed as limiting. A selection of the five shift elements A, B, C, D, E may also be formed as claw shift elements, in particular the first shift element A and the fourth shift element D. This applies to all exemplary embodiments.

Figure 2:
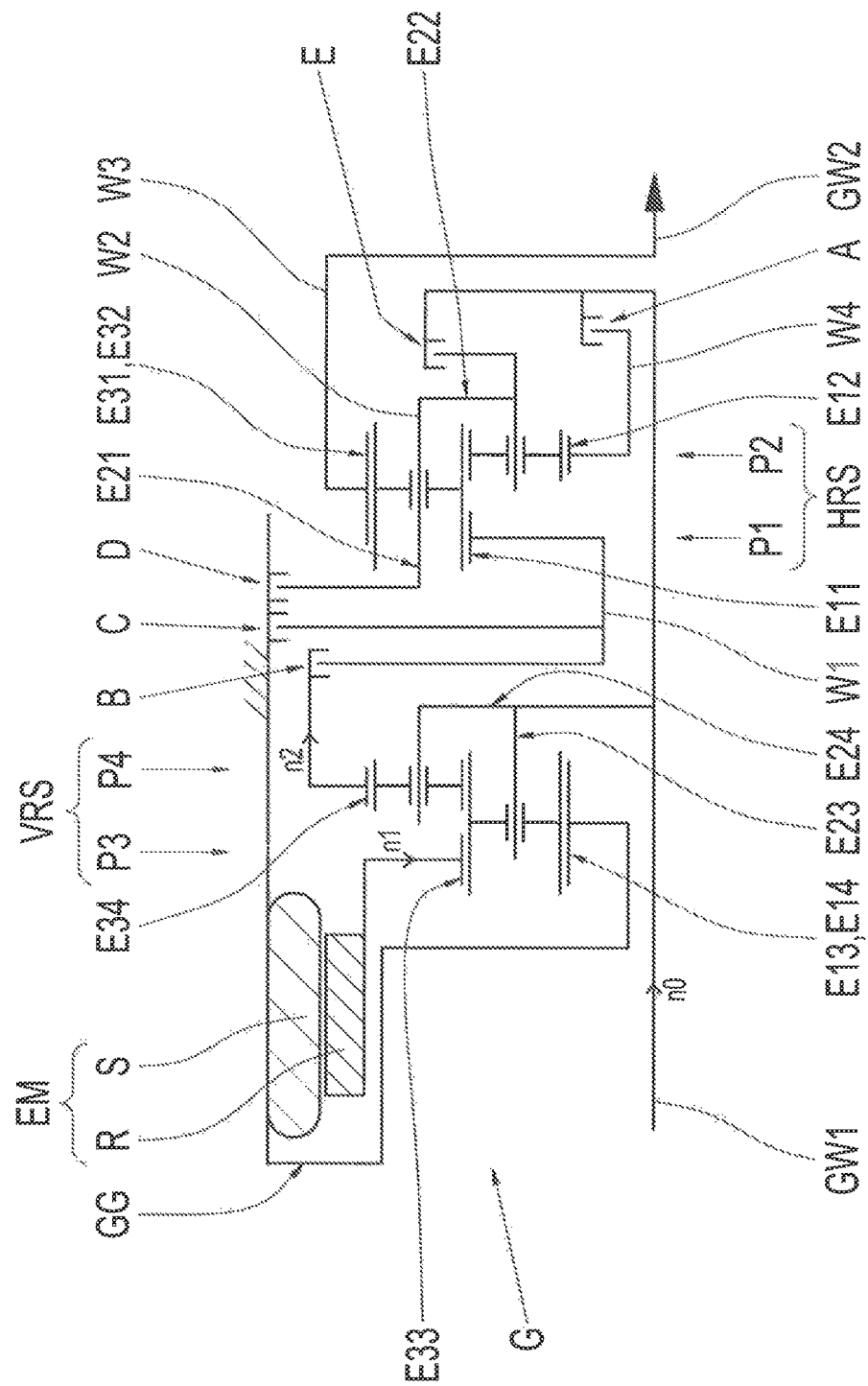
FIG. 2 schematically shows a transmission according to a second exemplary embodiment of the invention.

FIG. 2 schematically shows a transmission G for a motor vehicle in accordance with a second exemplary embodiment of the invention. In contrast to the first exemplary embodiment, the upstream gear set VRS is now configured as a Ravigneaux gear set with a combined sun gear E13, E14. In addition, by closing the fifth shift element A, the drive shaft GW1 is now connected to the fourth shaft W4 of the main gear set HRS. The combined sun gear E13, E14 is constantly fixed in a torque-proof manner. The drive shaft GW1 is constantly connected to the common carrier E23, E24 of the third and fourth planetary gear sets P3, P4. The ring gear of the third planetary gear set P3 formed as a negative gear set is constantly connected to the rotor R. The ring gear of the E34 of the fourth planetary gear set P4 formed as a positive gear set is a component of that shaft at which the rotational speed n2 that is reduced compared to the rotational speed n0 of the drive shaft GW1 is made available.

In the transmission G in accordance with the second exemplary embodiment, the first shift element A can be arranged radially within the fifth shift element E. Thereby, the need for axial installation space of the entire transmission G is reduced. If the first shift element A is formed as positive-locking shift element, the radial proximity to the central axis of the transmission G is particularly advantageous, since positive-locking shift elements preferably must be designed with a small diameter.

The differences between the first and second exemplary embodiments are independent of each other. For example, with an upstream gear set VRS in accordance with FIG. 1, the first shift element A could also be arranged in the operative connection between the drive shaft GW1 and the fourth shaft W4 of the main gear set HRS, and/or, with an upstream gear set VRS in accordance with FIG. 2, the first shift element A could also be arranged in the operative connection between the fourth shaft W4 of the main gear set HRS and the ring gear E34 of the fourth planetary gear set P4.

Figure 3:
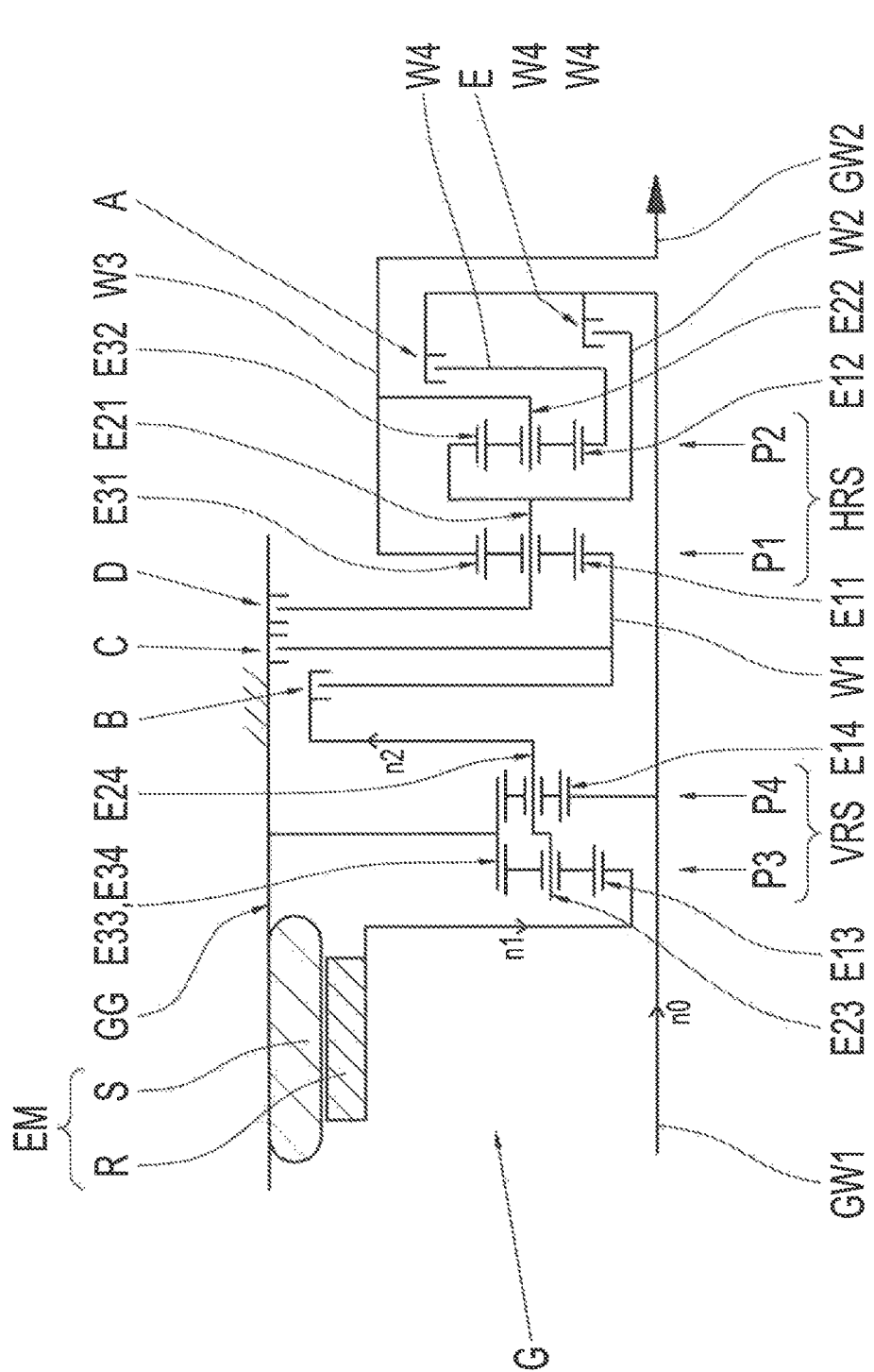
FIG. 3 schematically shows a transmission according to a third exemplary embodiment of the invention.

FIG. 3 schematically shows a transmission G for a motor vehicle according to a third exemplary embodiment of the invention. In contrast to the preceding exemplary embodiments, in the third exemplary embodiment, neither the upstream gear set VRS nor the main gear set HRS is formed as a Ravigneaux gear set. The third and fourth planetary gear sets P3, P4 are now formed as negative gear sets with a combined ring gear E33, E34, whereas the carrier E23 of the third planetary gear set P3 is constantly connected to the carrier E24 the fourth planetary gear set P4. The sun gear E13 of the third planetary gear set P3 is constantly connected to the rotor R. The sun gear E14 of the fourth planetary gear set P4 is constantly connected to the drive shaft GW1. The combined ring gear E33, E34 is constantly fixed in a torque-proof manner. Thus, a rotational speed n2, which is reduced compared to the rotational speed of the drive shaft n0, develops at the carrier E23 and the carrier 24. In the transmission G, in accordance with the third exemplary embodiment, by closing the first shift element A, a torque-proof connection between the fourth shaft W4 of the main gear set HRS and the drive shaft GW1 is established.

In accordance with the third exemplary embodiment, the first and second planetary gear sets P1, P2 of the main gear set HRS are formed as two negative planetary gear sets with a dual carrier/ring gear coupling. The sun gear E11 of the first planetary gear set P1 is a component of the first shaft W1 of the main gear set HRS. The carrier E21 of the first planetary gear set P1 and the ring gear E32 of the second planetary gear set P2 are constantly connected to each other, and are components of the second shaft W2 of the main gear set HRS. The ring gear E31 of the first planetary gear set P1 and the carrier E22 of the second planetary gear set P2 are constantly connected to each other, and form components of the third shaft W3 of the main gear set HRS. The sun gear E12 of the second planetary gear set P2 is a component of the fourth shaft W4 of the main gear set HRS.

Figure 4:
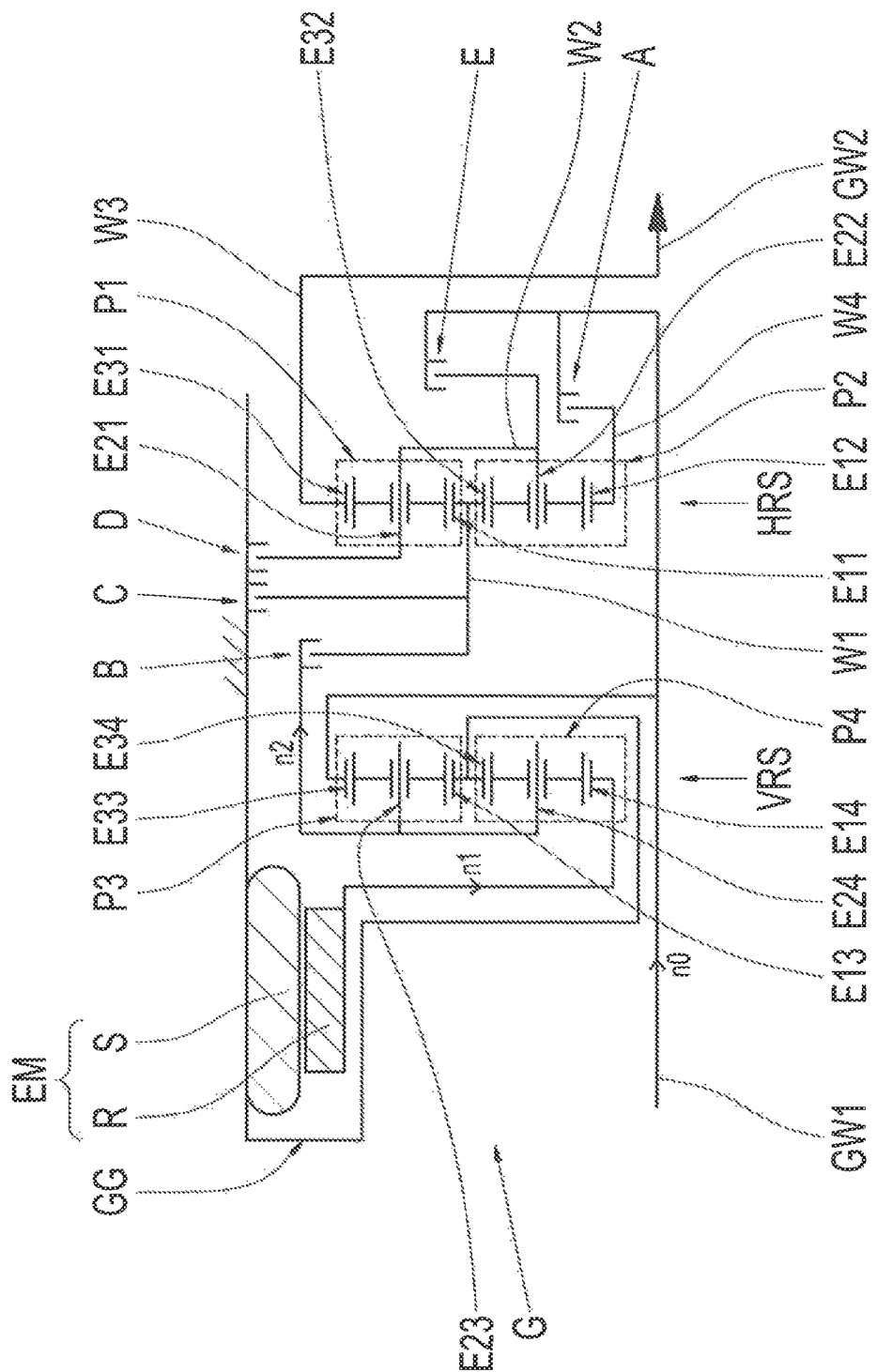
FIG. 4 schematically shows a transmission according to a fourth exemplary embodiment of the invention.

FIG. 4 schematically shows a transmission G for a motor vehicle according to a fourth exemplary embodiment of the invention. In contrast to the preceding exemplary embodiments, the planetary gear sets P1, P2 of the main gear set HRS are arranged on a common gear set level. The planetary gear sets P3, P4 of the upstream gear set VRS are also arranged on a common gear set level.

The fourth planetary gear set P4 is arranged radially within the third planetary gear set P3, whereas the sun gear E13 of the third planetary gear set P3 is formed on the outside diameter of the ring gear E34 of the fourth planetary gear set P4, and is thereby constantly fixed in a torque-proof manner. The sun gear E14 of the fourth planetary gear set P4 is constantly connected to the rotor R. The carrier E24 the fourth planetary gear set P4 and the carrier E23 of the third planetary gear set P3 are connected to each other. The ring gear E33 of the third planetary gear set P3 is constantly connected to the drive shaft GW1. Thereby, on the carriers E23, E24 of the third and fourth planetary gear sets P3, P4, a rotational speed n2 that is reduced compared to the rotational speed n0 of the drive shaft GW1 develops.

The second planetary gear set P2 is arranged radially within the first planetary gear set P1, whereas the sun gear E11 of the first planetary gear set P1 is formed on the outer diameter of the ring gear E32 of the second planetary gear set P2. The carrier E21 of the first planetary gear set P1 is constantly connected to the carrier E22 of the second planetary gear set P2. The sun gear E11 of the first planetary gear set P1 is a component of the first shaft W1 of the main gear set HRS. The carriers E21, E22 of the first and second planetary gear sets P1, P2 are components of the second shaft W2 of the main gear set HRS. The ring gear E31 of the first planetary gear set P1 is a component of the third shaft W3 of the main gear set HRS. The sun gear E12 of the second planetary gear set P2 is a component of the fourth shaft W4 of the main gear set HRS.

In the transmission G in accordance with the fourth exemplary embodiment, a torque-proof connection between the drive shaft GW1 and the fourth shaft W4 of the main gear set HRS is produced by closing the first shift element.

Figure 5:
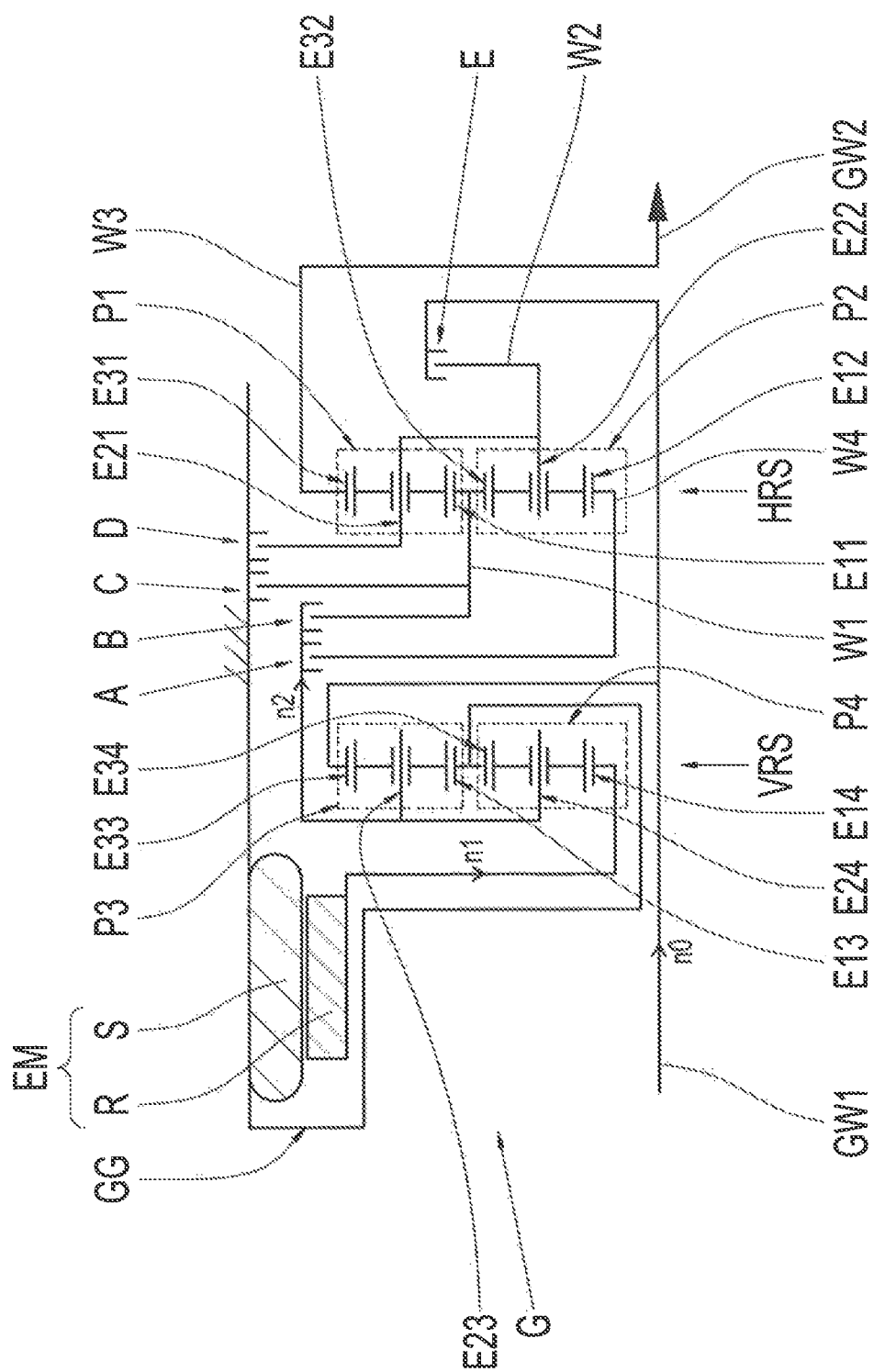
FIG. 5 schematically shows a transmission according to a fifth exemplary embodiment of the invention.

FIG. 5 schematically shows a transmission G for a motor vehicle according to a fifth exemplary embodiment of the invention. The fifth exemplary embodiment substantially corresponds to the fourth exemplary embodiment. The only difference is with respect to the first shift element A. By closing the first shift element A, a torque-proof connection between the fourth shaft W4 of the main gear set HRS and that shaft of the upstream gear set at which the rotational speed n2 that is reduced compared to the rotational speed n0 of the drive shaft GW1 is established.

FIG. 6 shows a rotational speed diagram of the first and fifth exemplary embodiments of the transmission G. FIG. 7 shows a rotational speed diagram of the second through fourth exemplary embodiments. In the rotational speed diagram, the rotational speeds of the four shafts W1, W2, W3, W4 of the main gear set HRS are plotted in relation to the rotational speed n0 of the drive shaft GW1 in the vertical direction. The maximum rotational speed n0 of the drive shaft GW1 that arises is normalized to the value of one. The distances between the four shafts W1, W2, W3, W4 of the main gear set HRS arise from the stationary transmission ratios of the first planetary gear set and second planetary gear set. The presentation is intended solely for illustration and is not drawn to scale. At a given operating point, associated rotational speed relationships are connected by a straight line.

If two of the four shafts W1, W2, W3, W4 are connected to each other, such interconnected shafts rotate at the same speed. For the sake of clarity, such connected shafts can be displayed as horizontally separate from each other in the rotational speed diagram. The horizontal distance between the shafts connected in such a manner that is thereby selected in the rotational speed diagram is arbitrary. Naturally, the transmission ratio between such connected shafts is the value of one, regardless of the horizontal distance chosen in the rotational speed diagram.

FIG. 8 shows a shifting diagram of the transmission G, which applies to all exemplary embodiments. In the rows of the shifting diagram, six forward gears G1 to G6, one reverse gear R1, and one parking lock P are indicated. In the columns of the shifting diagram, a circle indicates which shift elements A, B, C, D, E are closed in which gear or operating mode, as the case may be. Through the shifting diagram in FIG. 8 and the rotational speed diagrams in FIG. 6 and FIG. 7, the functioning of the transmission G is made clear.

In the shifting diagram shown in FIG. 8, the transmission ratio relationships between the drive shaft GW1 and the output shaft GW2 are exemplified, as they arise from a transmission G in accordance with the fourth exemplary embodiment. The stationary transmission ratios used for this purpose are as follows: first planetary gear set P1: −1.6, second planetary gear set P2: −2.2, third planetary gear set P3: −1.5, fourth planetary gear set P4: −2.0. Such a transmission ratio sequence is well-suited for use of the transmission G in a motor vehicle.

If both the third shift element C and the fourth shift element D are formed as positive-locking claw shift elements, a parking lock P can be realized by closing both of such shift elements. This is because, through a torque-proof fixing of two shafts of the main gear set HRS, in this case the fixing of the first shaft W1 and the second shaft W2, the output shaft GW2 is fixed in a torque-proof manner. Preferably, the third and fourth shift elements C, D are formed in such a manner that, in a power-free state, they securely retain their shifting state.

FIG. 9 shows a hybrid drive train of a motor vehicle with a transmission G in accordance with the fourth exemplary embodiment. This is to be viewed merely as exemplary. The hybrid drive train could be designed with any of the listed exemplary embodiments of the transmission G. The hybrid drive train features an internal combustion engine VKM, which is connected through a torsional vibration damper TS to the connecting shaft AN of the transmission G. The connecting shaft AN is connectable through a sixth shift element K0 to the drive shaft GW1 of the transmission G. The output shaft is GW2 connected with drive effect to an axle drive AG. Starting from the axle drive AG, the power applied to the output shaft GW2 is distributed to the wheels DW of the motor vehicle. During engine mode of the electric motor EM, electric power is supplied to the stator S by a power inverter (not shown). During generator mode of the electric motor EM, the stator S supplies electric power to the power inverter. In an additional operating mode, the electric motor EM may be used to recharge an energy storage device of the motor vehicle when the motor vehicle is at a standstill. For this purpose, the sixth shift element K0 is to be closed, whereas a maximum of one of the five shift elements A-E may be closed. Thus, the internal combustion engine VKM powers the electric motor EM, without transmitting power to the output shaft GW2.

The transmission G shown in FIG. 9 also features a second electric motor EM2, the rotor of which is connected in a torque-proof manner to the connecting shaft AN. The second electric motor EM2 is optionally provided. Through the second electric motor EM, the internal combustion engine VKM can be started, even if the sixth shift element K0 is open. With a closed sixth shift element K0, the second electric motor EM2 may also account for the drive of the motor vehicle. Such a second electric motor EM2 may be used with any exemplary embodiment of the transmission G. The second electric motor EM2 may also be arranged outside of the transmission G, for example in the form of a belt starter generator at the internal combustion engine VKM.

Modifications and variations can be made to the embodiments illustrated or described herein without departing from the scope and spirit of the invention as set forth in the appended claims.

REFERENCE SIGNS

G Transmission
GW1 Drive shaft
GW2 Output shaft
AN Connecting shaft
GG Housing
EM Electric motor
S Stator
R Rotor
VRS Upstream gear set
HRS Main gear set
W1 First shaft of the main gear set
W2 Second shaft of the main gear set
W3 Third shaft of the main gear set
W4 Fourth shaft of the main gear set
n0 Rotational speed of the drive shaft
n1 Increased rotational speed
n2 Reduced rotational speed
P1 First planetary gear set
E11 Sun gear of the first planetary gear set
E21 Carrier of the first planetary gear set
E31 Ring gear of the first planetary gear set
P2 Second planetary gear set
E12 Sun gear of the second planetary gear set
E22 Carrier of the second planetary gear set
E32 Ring gear of the second planetary gear set
P3 Third planetary gear set
E13 Sun gear of the third planetary gear set
E23 Carrier of the third planetary gear set
E33 Ring gear of the third planetary gear set
P4 Fourth planetary gear set
E14 Sun gear of the fourth planetary gear set
E24 Carrier of the fourth planetary gear set
E34 Ring gear of the fourth planetary gear set
A First shift element
B Second shift element
C Third shift element
D Fourth shift element
E Fifth shift element
K0 Sixth shift element
G1-G6 First to sixth forward gears
R1 Reverse gear
P Parking lock
VKM Internal combustion engine
DW Gears
AG Axle drive
TS Torsional vibration damper
EM2 Second electric motor

The invention claimed is:

1. A transmission for a motor vehicle, comprising
a drive shaft;
an output shaft;
an upstream gear set having one shaft configured to rotate at an increased rotational speed relative to a rotational speed of the drive shaft, the upstream gear set having an additional shaft configured to rotate at a reduced rotational speed relative to the rotational speed of the drive shaft, the upstream gear set configured such that a continuously fixed transmission ratio is defined between the increased rotational speed of the one shaft, the reduced rotational speed of the additional shaft and the rotational speed of the drive shaft;
a main gear set comprising a first planetary gear set and a second planetary gear set, the first and second planetary gear sets collectively having a first shaft, a second shaft, a third shaft and a fourth shaft designated in the order of rotational speed such that there is a linear rotational speed relationship between the first, second, third and fourth shafts, the order of rotational speed is in the order of the first shaft, the second shaft, the third shaft and then the fourth shaft, the additional shaft of the upstream gear set is connectable in a first power path to the first shaft of the main gear set, the drive shaft is directly connectable in a second power path to the second shaft of the main gear set through a single shift element of a plurality of shift elements;
an electric motor with a rotatable rotor and a torque-proof stator, the rotor of the electric motor constantly connected to the one shaft of the upstream gear set; and
wherein the plurality of shift elements has at least three shift elements, selective closing of the plurality of shift elements in combinations of two determines a plurality of rotational speed relationships between the first, second, third and fourth shafts of the main gear set and produces a plurality of forward gears between the drive shaft and the output shaft.

2. The transmission of claim 1, wherein:
the plurality of shift elements has a total of five shift elements;
the first shaft of the main gear set is fixable in a torque-proof manner by a third shift element of the five shift elements;
the first shaft of the main gear set connectable to the additional shaft of the upstream gear set by a second shift element of the five shift elements;
the second shaft of the main gear set fixable in a torque-proof manner by a fourth shift element of the five shift elements;
the second shaft of the main gear set connectable to the drive shaft by a fifth shift element of the five shift elements;
the third shaft of the main gear set constantly connected to the output shaft; and
the fourth shaft of the main gear set connectable to either the drive shaft or to the additional shaft of the upstream gear set by a first shift element of the five shift elements.

3. The transmission of claim 2, wherein:
the first shift element and the fourth shift element are closed in a first forward gear of the plurality of forward gears;
the first shift element and the third shift element are closed in a second forward gear of the plurality of forward gears;
the first shift element and the second shift element are closed in a third forward gear of the plurality of forward gears;
the first shift element and the fifth shift element are closed in a fourth forward gear of the plurality of forward gears;

the second shift element and the fifth shift element are closed in a fifth forward gear of the plurality of forward gears; and the third shift element and the fifth shift element are closed in a sixth forward gear of the plurality of forward gears.

4. The transmission of claim 2, wherein the second shift element and the fourth shift element are closed in a reverse gear.

5. The transmission of claim 2, wherein the first shift element is a positive-locking shift element.

6. The transmission of claim 2, wherein the fourth shift element is a positive-locking shift element.

7. The transmission of claim 1, wherein:
the upstream gear set comprises a third planetary gear set and a fourth planetary gear set, the third and fourth planetary gear sets forming a Ravigneaux gear set with a combined ring gear, the third planetary gear set formed as a negative gear set and the fourth planetary gear set formed as a positive gear set;
a sun gear of the fourth planetary gear is fixed in a torque-proof manner;
a common carrier of the third and fourth planetary gear sets is constantly connected to the drive shaft;
a sun gear of the third planetary gear set is constantly connected to the one shaft of the upstream gear set; and
the combined ring gear of the third and fourth planetary gear sets is a component of the additional shaft of the upstream gear set.

8. The transmission of claim 1, wherein:
the upstream gear set comprises a third planetary gear set and a fourth planetary gear set, the third and fourth planetary gear sets forming a Ravigneaux gear set with a combined sun gear, the third planetary gear set formed as a negative gear set and the fourth planetary gear set formed as a positive gear set;
the combined sun gear of the third and fourth planetary gear sets constantly fixed in a torque-proof manner;
a ring gear of the fourth planetary gear set is a component of the additional shaft of the upstream gear set;
a common carrier of the third and fourth planetary gear set is constantly connected to the drive shaft; and
a ring gear of the third planetary gear set is constantly connected to the one shaft of the upstream gear set.

9. The transmission of claim 1, wherein:
the upstream gear set comprises a third planetary gear set and a fourth planetary gear set, the third and fourth planetary gear sets each formed as negative gear sets;
a combined ring gear of the third and fourth planetary gear sets is constantly fixed in a torque-proof manner;
a carrier of the third planetary gear set and a carrier of the fourth planetary gear set are connected to each other and are components of the additional shaft of the upstream gear set;
a sun gear of the fourth planetary gear set is constantly connected to the drive shaft; and
a sun gear of the third planetary gear set is constantly connected to the one shaft of the upstream gear set.

10. The transmission of claim 1, wherein:
the upstream gear set comprises a third planetary gear set and a fourth planetary gear set, the third and fourth planetary gear sets formed as negative gear sets;
the fourth planetary gear set is positioned radially within the third planetary gear set;
a sun gear of the third planetary gear set is formed on an outside diameter of a ring gear of the fourth planetary gear set;
a ring gear of the third planetary gear set is constantly connected to the drive shaft;
a carrier of the third planetary gear set and a carrier of the fourth planetary gear set are components of the additional shaft of the upstream gear set;
a sun gear of the fourth planetary gear set is constantly connected to the one shaft of the upstream gear set; and
the ring gear of the fourth planetary gear set is constantly fixed in a torque-proof manner.

11. The transmission of claim 1, wherein:
the main gear set is a Ravigneaux gear set with a combined ring gear, the first planetary gear set formed as a negative gear set, the second planetary gear set formed as a positive gear set;
a sun gear of the first planetary gear set forming a component of the first shaft;
a common carrier of the first and second planetary gear sets is a component of the second shaft;
a combined ring gear of the first and second planetary gear sets is a component of the third shaft; and
a sun gear of the second planetary gear set is a component of the fourth shaft.

12. The transmission of claim 1, wherein:
the first and second planetary gear sets of the main gear set are formed as negative gear sets;
a sun gear of the first planetary gear set is a component of the first shaft;
a carrier of the first planetary gear set and a ring gear of the second planetary gear set are components of the second shaft;
a ring gear of the first planetary gear set and a carrier of the second planetary gear set are components of the third shaft; and
a sun gear of the second planetary gear set is a component of the fourth shaft.

13. The transmission of claim 1, wherein:
the first and second planetary gear sets of the main gear set are formed as negative gear sets;
the second planetary gear set is positioned radially within the first planetary gear set;
a sun gear of the first planetary gear set formed on an outer diameter of a ring gear of the second planetary gear set;
the sun gear of the first planetary gear set is a component of the first shaft;
a carrier of the first planetary gear set and a carrier of the second planetary gear set are components of the second shaft;
a ring gear of the first planetary gear set is a component of the third shaft; and
a sun gear of the second planetary gear set is a component of the fourth shaft.

14. The transmission of claim 1, further comprising a connecting shaft, the connecting shaft connectable to the input shaft by an additional shift element.

15. A hybrid drive train for a motor vehicle with the transmission of claim 14.

* * * * *